US012287193B2

(12) United States Patent
Lai

(10) Patent No.: US 12,287,193 B2
(45) Date of Patent: Apr. 29, 2025

(54) DUSTPROOF COUNTER DEVICE OF MEASURING WHEEL

(71) Applicant: Yin-Wu Lai, Taichung (TW)

(72) Inventor: Yin-Wu Lai, Taichung (TW)

( * ) Notice: Subject to any disclaimer, the term of this patent is extended or adjusted under 35 U.S.C. 154(b) by 449 days.

(21) Appl. No.: 17/977,071

(22) Filed: Oct. 31, 2022

(65) Prior Publication Data

US 2024/0142210 A1   May 2, 2024

(51) Int. Cl.
*G01B 3/12* (2006.01)
*G01B 5/04* (2006.01)

(52) U.S. Cl.
CPC ............. *G01B 3/12* (2013.01); *G01B 5/043* (2013.01)

(58) Field of Classification Search
CPC ......................................... G01B 3/12
USPC ..................................... 33/772–782
See application file for complete search history.

(56) References Cited

U.S. PATENT DOCUMENTS

| | | | | | |
|---|---|---|---|---|---|
| 3,696,510 | A | * | 10/1972 | Evans, Jr. ............... | G01B 3/12 235/96 |
| 3,791,038 | A | * | 2/1974 | Polydoris ............... | G01B 3/12 33/780 |
| 4,176,458 | A | * | 12/1979 | Dunn ...................... | G01B 3/12 33/781 |
| 4,970,802 | A | * | 11/1990 | Nosek .................... | G01B 3/12 33/711 |
| 5,052,687 | A | * | 10/1991 | Katerba ................. | G01C 22/004 473/150 |
| 7,040,036 | B1 | * | 5/2006 | Wang ...................... | G01B 3/12 33/772 |
| 7,111,412 | B2 | * | 9/2006 | Huang ..................... | G01B 3/12 33/772 |
| 7,694,431 | B2 | * | 4/2010 | Tang ....................... | G01B 3/12 403/109.8 |
| 9,482,508 | B2 | * | 11/2016 | Wojciechowski ....... | G01B 3/12 |
| 9,803,965 | B2 | * | 10/2017 | Thorp ...................... | G01B 3/12 |
| 10,036,621 | B2 | * | 7/2018 | Wang ...................... | G01B 3/12 |
| 10,119,800 | B2 | * | 11/2018 | Wang ...................... | G01B 3/12 |
| 10,480,921 | B2 | * | 11/2019 | Chen ....................... | G01B 3/12 |
| 12,055,414 | B2 | * | 8/2024 | Shi ........................... | G01B 3/12 |
| 12,111,151 | B1 | * | 10/2024 | Shi ........................... | G01B 5/004 |
| 2007/0084076 | A1 | * | 4/2007 | Wang ...................... | G01B 3/12 33/772 |
| 2008/0148591 | A1 | * | 6/2008 | Kao Lin ................. | G01B 3/12 33/772 |
| 2009/0064527 | A1 | * | 3/2009 | Weavers ................ | G01B 3/12 33/775 |
| 2014/0324383 | A1 | * | 10/2014 | Toom .................... | G01B 21/20 356/601 |

(Continued)

*Primary Examiner* — George B Bennett
(74) *Attorney, Agent, or Firm* — Best & Flanagan LLP

(57) ABSTRACT

A dustproof counter device of a measuring wheel has a base, a counter, and a pedal setting component. The base has a component opening formed through a top of the base and a dustproof flange protruding from the base and surrounding the component opening. The counter is disposed in the base and has a zeroing button extending into the component opening of the base. The pedal setting component has a dustproof cap covering and surrounding the dustproof flange of the base, and abutting against the zeroing button. When the pedal setting component is pressed by a user's foot, dust is kept from dropping into the base by the dustproof cap.

3 Claims, 6 Drawing Sheets

(56) References Cited

U.S. PATENT DOCUMENTS

| | | | |
|---|---|---|---|
| 2016/0202084 A1* | 7/2016 | Li | G01D 5/145 |
| | | | 324/207.21 |
| 2017/0370687 A1* | 12/2017 | Lai | G01B 3/12 |
| 2022/0107167 A1* | 4/2022 | Zeller | G01B 5/20 |

* cited by examiner

DUSTPROOF COUNTER DEVICE OF MEASURING WHEEL

BACKGROUND OF THE INVENTION

1. Field of the Invention

The present invention relates to a component of a distance measuring device, and more particularly to a dustproof counter device of a measuring wheel.

2. Description of Related Art

A measuring wheel is a common distance measuring instrument that is utilized to measure road distances, lengths of road markings, lengths of skid marks appearing on the accident site, or other ground distances.

With reference to FIGS. 6 and 6A, a conventional measuring wheel comprises a base 70, a rod body 80, and a wheel 90. A mechanical counter is disposed in the base 70 and shows a distance data currently being measured. The rod body 80 is elongated, is connected to the base 70, and is adapted to be held by a user's hand for conveniently operating the conventional measuring wheel. The wheel 90 is rotatably connected to and located below the base 70. A gear device is connected to the wheel 90 and is driven by the rotating wheel 90 to drive the counter to count a measured distance.

After measuring, the counter should be reset to zero. A zeroing button 71 disposed at the base 70 is connected to the counter. The zeroing button 71 can be pressed by the user's foot to reset the counter to zero conveniently. However, because a gap is formed between the zeroing button 71 and the base 70, when the zeroing button 71 is pressed by the user's foot, dusts on a shoe outsole easily drop into the base 70 via the gap between the zeroing button 71 and the base 70. The dusts dropping into the base 70 are easily attached to gears disposed inside the base 70, so the gears cannot work smoothly and the accuracy of the conventional measuring wheel is reduced. Accordingly, the service life of the conventional measuring wheel is also reduced.

To overcome the shortcomings, the present invention provides a dustproof counter device of a measuring wheel to mitigate or obviate the aforementioned problems.

SUMMARY OF THE INVENTION

The main objective of the present invention is to provide a dustproof counter device of a measuring wheel to prevent the dusts from dropping into a base of the dustproof counter of the measuring wheel.

The dustproof counter device of the measuring wheel comprises a base, a counter, and a pedal setting component. The base has a base space formed in the base, a component opening formed through a top of the base and communicating with the base space, and a dustproof flange protruding from the top of the base and surrounding the component opening. The counter is disposed in the base space of the base and has a zeroing button extending into the component opening of the base. The pedal setting component is plugged into the component opening of the base and abuts against the zeroing button. The pedal setting component has a dustproof cap located at a top of the pedal setting component, covering and surrounding the dustproof flange, and abutting against the zeroing button.

Other objects, advantages, and novel features of the invention will become more apparent from the following detailed description when taken in conjunction with the accompanying drawings.

DETAILED DESCRIPTION OF PREFERRED EMBODIMENT

Figures 1, 1A:
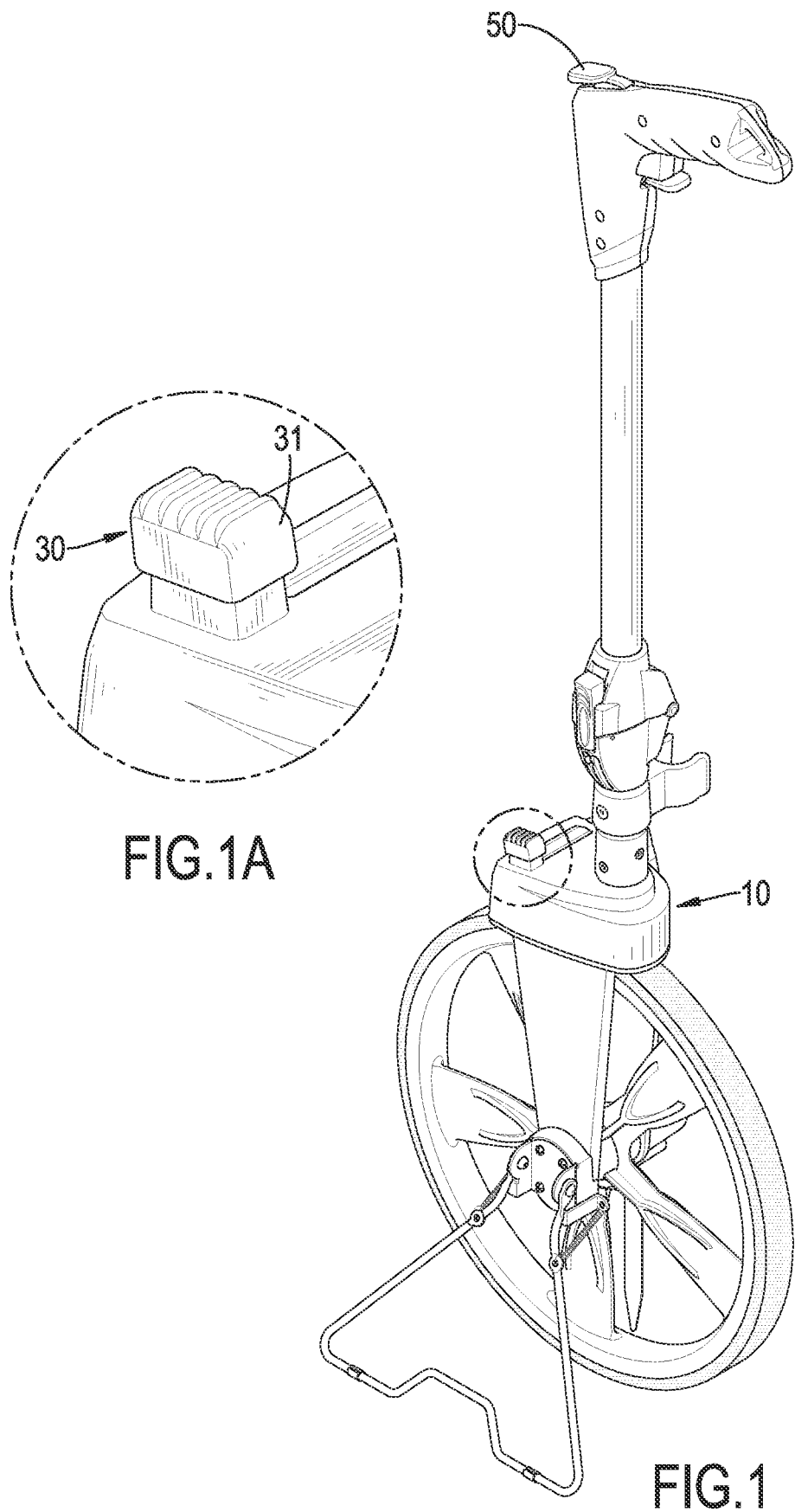
FIG. 1 is a perspective view of a dustproof counter device of a measuring wheel in accordance with the present invention mounted on the measuring wheel.
FIG. 1A is an enlarged perspective view of the dustproof counter device of the measuring wheel in FIG. 1.
Figure 2:
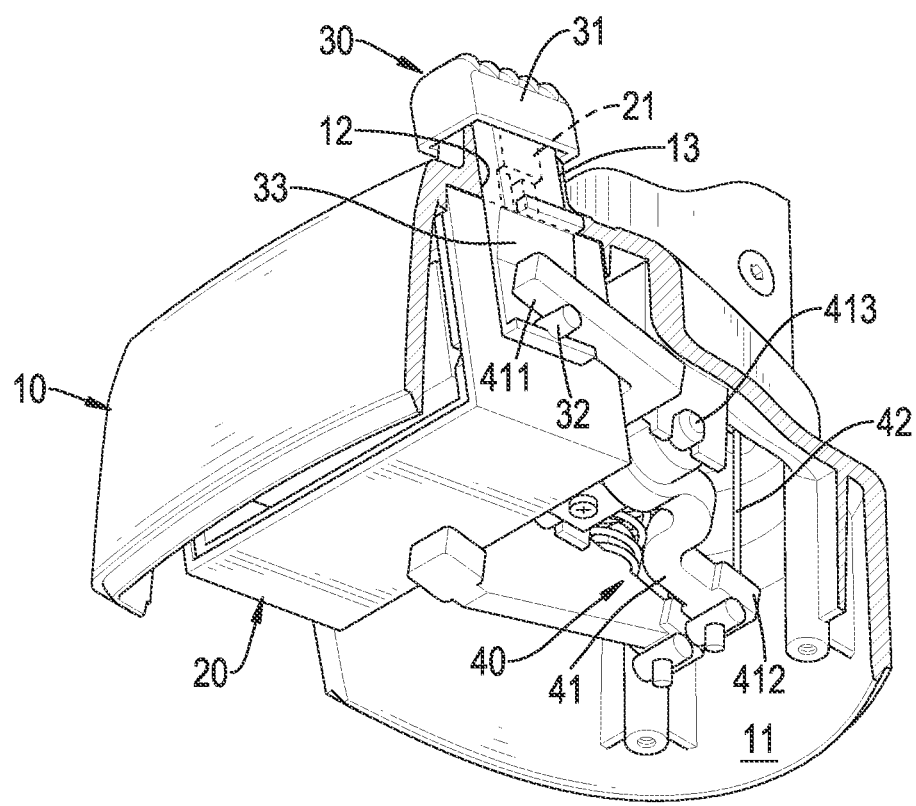
FIG. 2 is a perspective view in partial section of the dustproof counter device of the measuring wheel in FIG. 1.

With reference to FIGS. 1, 1A, and 2, a counter device of a measuring wheel in accordance with the present invention has a base 10, a counter 20, a pedal setting component 30, and a manual setting assembly 40.

The base 10 has a base space 11, a component opening 12, and a dustproof flange 13. The base space 11 is formed in the base 10. The component opening 12 is formed through a top of the base 10 and communicates with the base space 11. The dustproof flange 13 protrudes from the top of the base 10 and surrounds the component opening 12.

The counter 20 is disposed in the base space 11 and has a zeroing button 21. The zeroing button 21 is disposed on the counter 20, is located in the component opening 12 of the base 10, and extends into the component opening 12 of the base 10. The counter 20 shows a measuring distance currently being measured by the measuring wheel. When the zeroing button 21 is pressed, the numerical figures shown on the counter 20 are reset to zero. The pedal setting component 30 is elongated, is plugged into the component opening 12, and abuts against the zeroing button 21. The pedal setting component 30 has a dustproof cap 31 and an abutting rod 32. The dustproof cap 31 is located on a top of the pedal setting component 30 and covers and surrounds the dustproof flange 13. The dustproof cap 31 also abuts against the zeroing button 21. The abutting rod 32 is located near a bottom of the pedal setting component 30 and extends away from the counter 20. The pedal setting component 30 has an arm 33 extending from a bottom of the dustproof cap 31, extending into the component opening 12 of the base 10, and located at a side of the counter 20. The abutting rod 32 laterally extends from a side of the arm 33, extends opposite to the counter 20, and is located near a bottom of the arm 33.

The manual setting assembly 40 comprises a lever 41 and a control cable 42. A middle portion of the lever 41 is pivotally connected to the base 10. The lever 41 is elongated and includes a linkage end 411, a controlled end 412, and a pivot 413. The linkage end 411 and the controlled end 412 are respectively located at two opposite ends of the lever 41. The pivot 413 is located between the linkage end 411 and the controlled end 412 and is pivotally connected to the base 10. The pedal setting component 30 is configured to be pressed by the linkage end 411. A bottom of the linkage end 411 is configured to abut against the abutting rod 32 of the pedal setting component 30. The control cable 42 is connected to the controlled end 412 of the lever 41. The control cable 42 is connected to a manual setting trigger 50 disposed at a handle of the measuring wheel.

Figure 3:
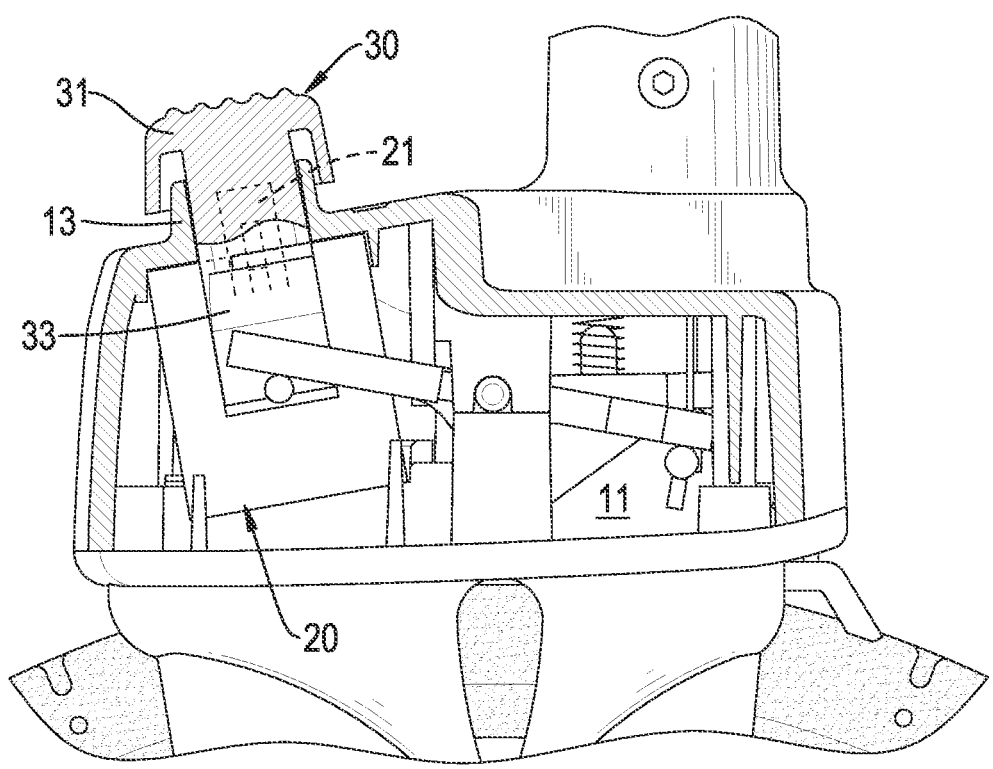
FIG. 3 is a side view in partial section of the dustproof counter device of the measuring wheel in FIG. 1.
Figure 4:
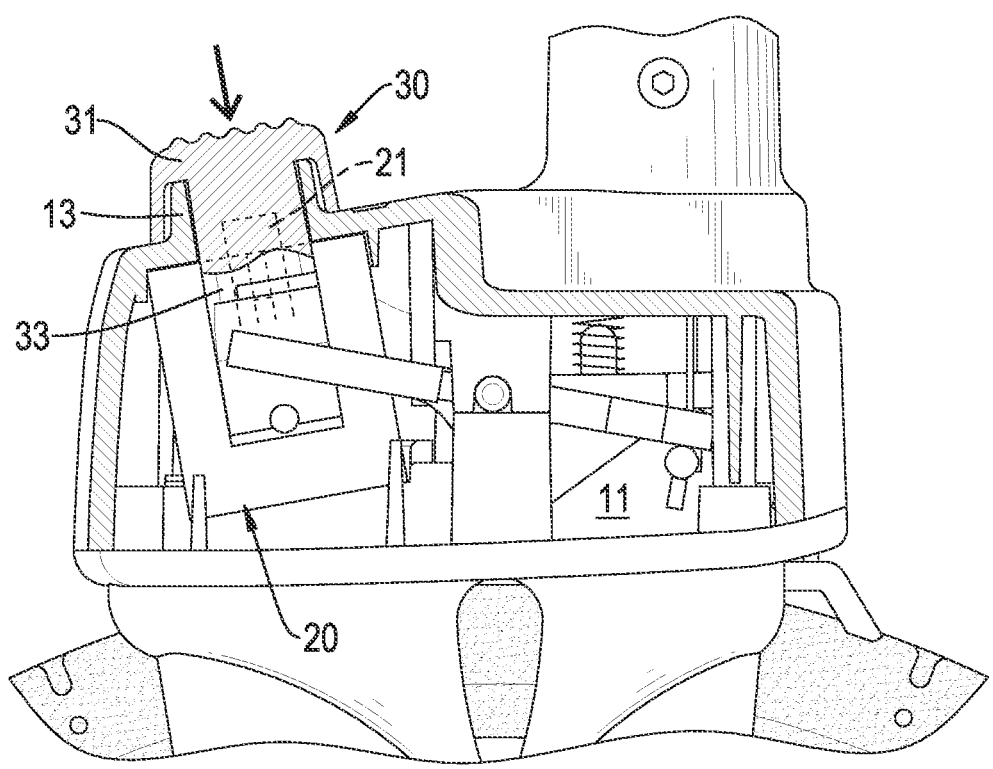
FIG. 4 is an operational side view in partial section of the dustproof counter device of the measuring wheel in FIG. 1, showing that a pedal setting component is directly pressed.

With reference to FIGS. 3 and 4, the dustproof cap 31 can be directly pressed, by a user's foot or hand, to push the zeroing button 21, thereby resetting the numerical figures shown on the counter 20 to zero. Because the dustproof cap 31 covers and surrounds the dustproof flange 13, dust is prevented from dropping into the base space 11 of the base 10 via a gap between the dustproof flange 13 and the pedal setting component 30. The base space 11 of the base 10 is kept clean to prolong the service life of the measuring wheel.

Figure 5:
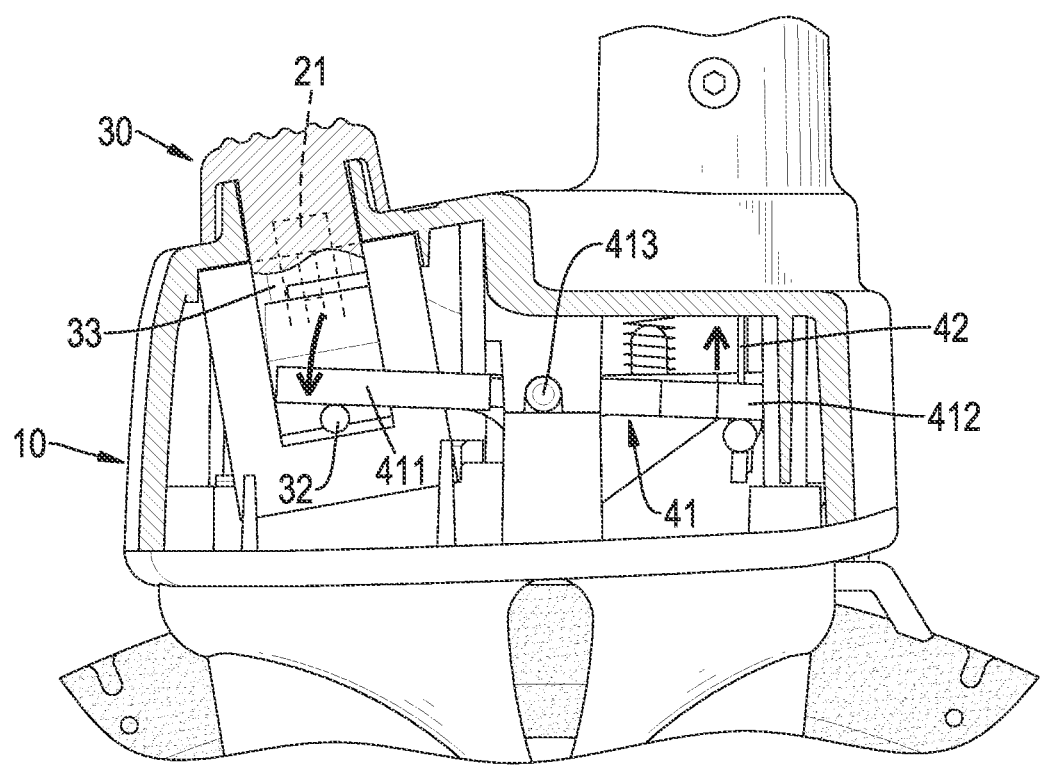
FIG. 5 is another operational side view in partial section of the dustproof counter device of the measuring wheel in FIG. 1.
Figures 6, 6A:
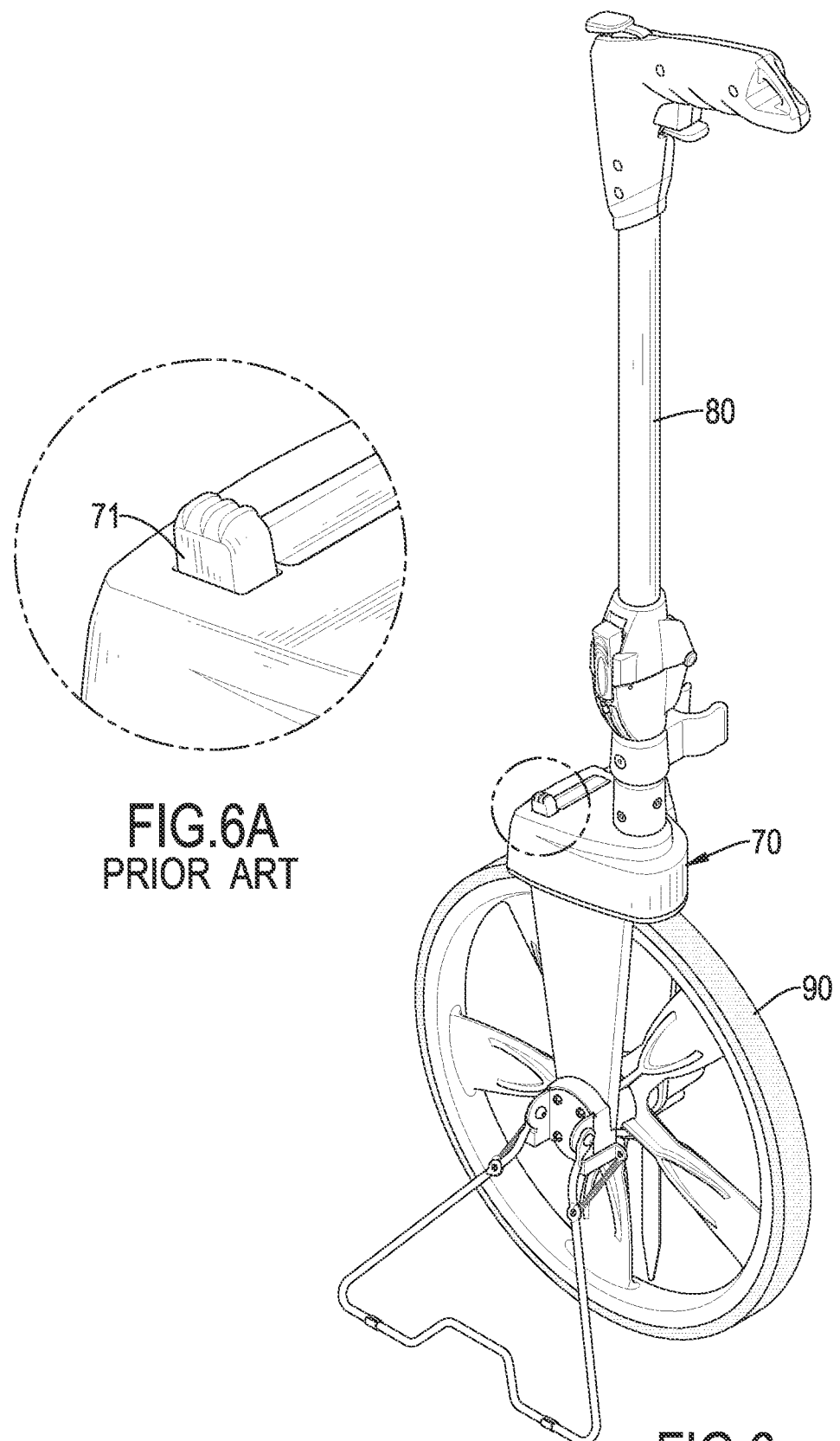
FIG. 6 is a perspective view of a conventional measuring wheel in accordance with a prior art.
FIG. 6A is an enlarged perspective view of the conventional measuring wheel in FIG. 6.

With reference to FIGS. 1 and 5, the control cable 42 is connected to the manual setting trigger 50. The manual setting trigger 50 can be pressed by the user's hand to pull the control cable 42 to move up to pull the controlled end 412 of the lever 41, thereby pivoting the lever 41 around the pivot 413 connected to the base 10. When the controlled end 412 of the lever 41 is pulled up by the control cable 42, the linkage end 411 of the lever 41 is turned down to press the abutting rod 32, thereby pressing the pedal setting component 30 downwardly to press the zeroing button 21 to reset the numerical figures shown on the counter 20 to zero.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dustproof counter device of a measuring wheel, the dustproof counter device comprising:
    a base having
        a base space formed in the base;
        a component opening formed through a top of the base and communicating with the base space; and
        a dustproof flange protruding from the top of the base and surrounding the component opening;
    a counter disposed in the base space of the base and having
        a zeroing button extending into the component opening of the base;
    a pedal setting component plugged into the component opening of the base, abutting against the zeroing button, and having
        a dustproof cap located at a top of the pedal setting component, covering and surrounding the dustproof flange of the base, and abutting against the zeroing button.

2. The dustproof counter device of the measuring wheel as claimed in claim 1, wherein the dustproof counter device comprises a manual setting assembly;
    the manual setting assembly comprises a lever and a control cable;
    the lever is pivotally connected to the base and has
        a linkage end and a controlled end respectively located at two opposite ends of the lever; and
        a pivot located between the linkage end and the controlled end and pivotally connected to the base;
    the pedal setting component is configured to be pressed by the linkage end of the lever; and
    the control cable is connected to the controlled end of the lever.

3. The dustproof counter device of the measuring wheel as claimed in claim 2, wherein
    the pedal setting component has an abutting rod located near a bottom of the pedal setting component; and
    a bottom of the linkage end of the lever is configured to abut against the abutting rod.

\* \* \* \* \*